US008245933B2

(12) United States Patent
Isles et al.

(10) Patent No.: US 8,245,933 B2
(45) Date of Patent: Aug. 21, 2012

(54) METHOD AND SYSTEM FOR APPLYING A POSTAL AUTHORITY BARCODE ON A DOCUMENT PROCESSING SYSTEM

(75) Inventors: Marvin L. Isles, Juneau, AK (US); Mark Gerard Paul, Raleigh, NC (US); Walter S. Conard, Lake Villa, IL (US); Leondo R. Phifer, Chicago Heights, IL (US); Michael J. McIntee, El Dorado Hills, CA (US); Michael Boston, Ontario (CA); Roger Spitzig, Ontario (CA); Robert Richards, Ontario (CA)

(73) Assignee: Bell and Howell, LLC, Durham, NC (US)

( * ) Notice: Subject to any disclaimer, the term of this patent is extended or adjusted under 35 U.S.C. 154(b) by 332 days.

(21) Appl. No.: 12/604,781

(22) Filed: Oct. 23, 2009

(65) Prior Publication Data

US 2010/0106290 A1 Apr. 29, 2010

Related U.S. Application Data

(60) Provisional application No. 61/108,261, filed on Oct. 24, 2008.

(51) Int. Cl.

| | |
|---|---|
| ***G06K 7/10*** | (2006.01) |
| ***G06K 19/06*** | (2006.01) |
| ***G06K 5/04*** | (2006.01) |
| ***G06K 9/00*** | (2006.01) |
| ***G06K 5/00*** | (2006.01) |
| ***G06K 7/00*** | (2006.01) |
| ***G06K 7/14*** | (2006.01) |
| ***G08C 21/00*** | (2006.01) |
| ***G06Q 20/00*** | (2012.01) |

(52) U.S. Cl. ......... 235/462.02; 235/462.01; 235/462.07; 235/462.12; 235/435; 235/437; 235/438; 235/454; 705/60; 705/61; 705/62

(58) Field of Classification Search .............. 705/60–62; 235/462.01, 462.07, 462.12, 435, 437, 438, 235/454, 462.02

See application file for complete search history.

(56) References Cited

U.S. PATENT DOCUMENTS

| | | | | |
|---|---|---|---|---|
| 5,974,147 | A * | 10/1999 | Cordery et al. | 705/62 |
| 6,026,385 | A * | 2/2000 | Harvey et al. | 705/408 |
| 6,549,892 | B1 * | 4/2003 | Sansone | 705/401 |

(Continued)

OTHER PUBLICATIONS

U.S. Appl. No. 12/546,152, filed Aug. 24, 2009 by Richard Wojdyla et al.

*Primary Examiner* — Daniel Walsh

(74) *Attorney, Agent, or Firm* — McDermott Will & Emery LLP

(57) ABSTRACT

Systems, methods, and an article of manufacture for printing a new postal authority code on a mail piece prepared by and received from an inserter or wrapper. A barcode post-processing system receives a mail piece from an inserter and communicates with the image capture equipment. The barcode post-processing system during performs various functions. The functions can include receiving legacy address block information from the mail piece from the image capture equipment, processing the captured legacy address block information to determine one or more missing parameters of the new postal authority code to create processed data, and supplementing the captured legacy address block information data with the one or more missing parameters of the new postal authority code received from one or more data source.

28 Claims, 5 Drawing Sheets

U.S. PATENT DOCUMENTS

| | | | | |
|---|---|---|---|---|
| 6,557,755 | B1 | 5/2003 | Pickering, Jr. et al. | |
| 6,865,561 | B1 * | 3/2005 | Allport et al. | 705/406 |
| 7,834,289 | B2 * | 11/2010 | Orbke et al. | 209/584 |
| 2001/0054082 | A1 * | 12/2001 | Rudolph et al. | 709/217 |
| 2002/0078663 | A1 * | 6/2002 | Kramer et al. | 53/411 |
| 2003/0182154 | A1 * | 9/2003 | Myers et al. | 705/1 |
| 2004/0165748 | A1 * | 8/2004 | Bonner et al. | 382/101 |
| 2004/0215368 | A1 * | 10/2004 | Baker et al. | 700/226 |
| 2005/0018214 | A1 * | 1/2005 | DeWitt et al. | 358/1.1 |
| 2005/0025340 | A1 * | 2/2005 | Hickman | 382/101 |
| 2005/0137991 | A1 * | 6/2005 | Bruce et al. | 705/410 |
| 2005/0209977 | A1 * | 9/2005 | Avant et al. | 705/402 |
| 2005/0269416 | A1 * | 12/2005 | Sussmeier et al. | 235/494 |
| 2006/0113387 | A1 * | 6/2006 | Baker et al. | 235/462.12 |
| 2006/0131378 | A1 * | 6/2006 | Baker et al. | 235/375 |
| 2007/0038713 | A1 * | 2/2007 | Ryu | 709/206 |
| 2007/0129957 | A1 * | 6/2007 | Elliott et al. | 705/1 |
| 2009/0159509 | A1 * | 6/2009 | Wojdyla et al. | 209/584 |
| 2009/0287343 | A1 * | 11/2009 | Lee et al. | 700/227 |
| 2009/0287742 | A1 * | 11/2009 | Woolston et al. | 707/104.1 |
| 2009/0294338 | A1 * | 12/2009 | Lee et al. | 209/584 |
| 2010/0292833 | A1 * | 11/2010 | Gorp et al. | 700/221 |
| 2010/0293111 | A1 * | 11/2010 | Van Gorp et al. | 705/402 |
| 2011/0047100 | A1 * | 2/2011 | Wojdyla | 705/404 |
| 2011/0071665 | A1 * | 3/2011 | Brandt et al. | 700/227 |
| 2011/0114543 | A1 * | 5/2011 | Brandt | 209/584 |

* cited by examiner

310

| Type | Field | Digits | |
|---|---|---|---|
| | Barcode Identifier | 2 | 400 |
| Tracking Code (450) | Service Type Identifier | 3 | 410 |
| | Mailer ID | 6 | 420 |
| | Unique Identifier (unique number and / or ACS match back code) | 9 | 430 |
| Routing Code | Delivery Point Address Code | 0, 5, 9, or 11 | 440 |

Fig. 4

METHOD AND SYSTEM FOR APPLYING A POSTAL AUTHORITY BARCODE ON A DOCUMENT PROCESSING SYSTEM

RELATED APPLICATIONS

This application claims the benefit of U.S. Provisional Application No. 61/108,261, filed Oct. 24, 2008, the disclosure of which is entirely incorporated herein by reference.

TECHNICAL FIELD

The present subject matter relates to a system, method and apparatus necessary for reading data from an image of a document address block and using this data, in conjunction with other production job data, to populate the required data fields of a postal authority approved barcode. The resulting barcode is printed in the postal authority barcode clear zone, on the envelope, as part of mailpiece/mail item production on an inserter or wrapper.

BACKGROUND

Organizations that manufacture and deliver mailpieces to the postal authority for final delivery to customers have complex data and equipment configurations plus production procedures that are difficult to change when new regulations effecting the production of mail are issued by the postal authority. These procedures involve data processing systems to perform address update services and generate the required legacy barcodes (for example POSTNET™ and PLANET for the USPS®). The barcodes (POSTNET for delivery point and PLANET code® for CONFIRM® service and mailpiece tracking) are created with the data processing services and are integrated into the address block data when the final printer control file is created. In addition, key line data is collected and integrated into an alpha-numeric string which contains data such as, address change service participation, participant code and a unique matchback code used for address list updates. Inserter control data maybe included in the address block, in the form of a barcode such as a 2-D data matrix or a code 39 barcode. This barcode either contains the data needed to control assembly of the contents of the mailpiece or reference an entry in a data file that contains such assembly data. Achieving compliance with new postal regulations, whether they be domestic or international in scope, can be costly and time consuming since equipment changes are needed, Information Technology (IT) groups need to integrate new software and procedures and the factory work flow may change.

A recent example of a postal authority instituting new postal regulations is the United States Postal Authority (USPS); specifically requiring all mailers in the US to adapt to a new postal authority approved barcode known as the Intelligent Mail® Barcode (IMB). This barcode will combine all existing mailpiece data such as but not limited to POSTNET, PLANET barcodes and key line information. Hence, there exists a need for a largely self contained device to be attached to an inserter, wrapper, or to operate independently to generate a postal approved barcode, such as an IMB, from available data provided electronically and/or derived from an image containing the needed data. Furthermore, a solution is needed to enable the newly generated postal barcode to be printed in a postal authority approved area of the envelope. Only minor changes are required to the infrastructure in order to be compliant with the postal authority regulations. The method and system provided herein will fulfill this missing capability.

SUMMARY

The teachings herein alleviate one or more of the above noted deficiencies by providing a method for applying a postal authority barcode to a mail item processed on document processing equipment, such as an inserter or wrapper. In one instance, a method of printing a new postal authority code on a mail piece prepared by and received from an inserter in shown and describe. In various examples, certain actions are executed or carried out by a barcode post-processing system. In one example, the barcode post-processing system receives legacy address block information from the mail piece captured by an imaging system in communication with the barcode post-processing system and processing the captured legacy address block information to determine one or more missing parameters of the new postal authority code. The method also includes supplementing the captured legacy address block information with the one or more missing parameters of the new postal authority code. The one or more missing parameters can be received from one or more data sources in communication with barcode post-processing system. The method also includes printing the new postal authority code on a designated section of the mail piece, the designated section being defined by a standard regarding the new postal authority code.

In various examples, the legacy address block information includes at least one of the group consisting of: a PLANET code, a POSTNET code, key line data, mailer identification information, address information, and an inserter code. The new postal authority code can be an intelligent mail barcode (IMB).

In some examples, the method also includes, verifying a delivery point captured using optical character recognition from the legacy address block code prior to printing the new postal authority code. The verifying can include comparing the captured delivery point with information from a national address database to determine compliance of the delivery point.

The method can also include printing move update data above the new postal authority code. In some examples, the method includes assigning a unique identifier, generated by the barcode post-processing device, to the mail piece. In other examples, the method can include generating, by the barcode post-processing device, a tracking code being defined by some combination of a service type identifier, a mailer identifier, and the unique identifier, the service type identifier and mailer identifier being captured from the legacy address block data. The unique identifier can be included in the new postal authority code.

In some case, supplementing the processed data can include capturing an inserter control code from the mail piece, by the imaging processing system, requesting, by the barcode post-processing system, data associated with the inserter control code, and receiving the requested data from a data records system that stores the requested data associated with the inserter control code.

In another instance a mail processing system is shown and described. The system can include an inserter or wrapper, image capture equipment, a barcode post-processing system, and a printer. The barcode post-processing system receives a mail piece from the inserter and communicates with the image capture equipment. The barcode post-processing system, during operation of the mail processing system performs functions such as receiving legacy address block information from the mail piece from the image capture equipment, processing the captured legacy address block information to determine one or more missing parameters of the new postal authority code to create processed data, and supplementing the captured legacy address block information data with the one or more missing parameters of the new postal authority code received from one or more data sources. The printer prints the new postal authority code on a designated section of the mail piece. The designated section being defined by a standard regarding the new postal authority code.

In another instance, an article of manufacture is shown and described. The article includes a machine readable storage medium and executable program instructions embodied in the machine readable storage medium. When the instructions are executed by one or more programmable systems that receives a mail item from an inserter or wrapper, the instructions cause the one or more systems to perform functions that print a new postal authority code on a mail piece. The functions include receiving legacy address block information from the mail piece captured by an imaging system in communication with the one or more programmable systems that receives a mail item and processing the captured legacy address block information to determine one or more missing parameters of the new postal authority code to create processed data, The functions can also include supplementing the captured legacy address block information with the one or more missing parameters of the new postal authority code received from one or more data sources and printing the new postal authority code on a designated section of the mail piece. The designated section can be defined by a standard regarding the new postal authority code.

The advantages and novel features are set forth in part in the description which follows, and in part will become apparent to those skilled in the art upon examination of the following and the accompanying drawings or may be learned by production or operation of the examples. The advantages of the present teachings may be realized and attained by practice or use of the methodologies, instrumentalities and combinations described herein.

BRIEF DESCRIPTION OF THE DRAWINGS

The drawing figures depict one or more implementations in accord with the present teachings, by way of example only, not by way of limitation. In the figures, like reference numerals refer to the same or similar elements.

FIG. 4 is an exemplary table showing the information format for a postal authority barcode.

DETAILED DESCRIPTION

In the following detailed description, numerous specific details are set forth by way of examples in order to provide a thorough understanding of the relevant teachings. However, it should be apparent to those skilled in the art that the present teachings may be practiced without such details. In other instances, well known methods, procedures, components, and software have been described at a relatively high-level, without detail, in order to avoid unnecessarily obscuring aspects of the present teachings.

Described herein is an apparatus, method and system approach for applying a new postal authority barcode which includes significantly more information than the legacy barcodes. This is accomplishing with a Barcode Post Processing System that is added to the output section of an inserter or wrapper. The system will have minimal electrical and data interfaces and is intended to produce fully compliant barcodes with minimal impact to the IT systems. In addition, the Barcode Post Processing System (BPPS) can be a stand alone device that receives the contents of groups of mail pieces from a feed mechanism, reads the necessary data from the mail piece and combines this data with data stored in the barcode post processing computer to generate and print a new postal authority barcode.

Figure 1:
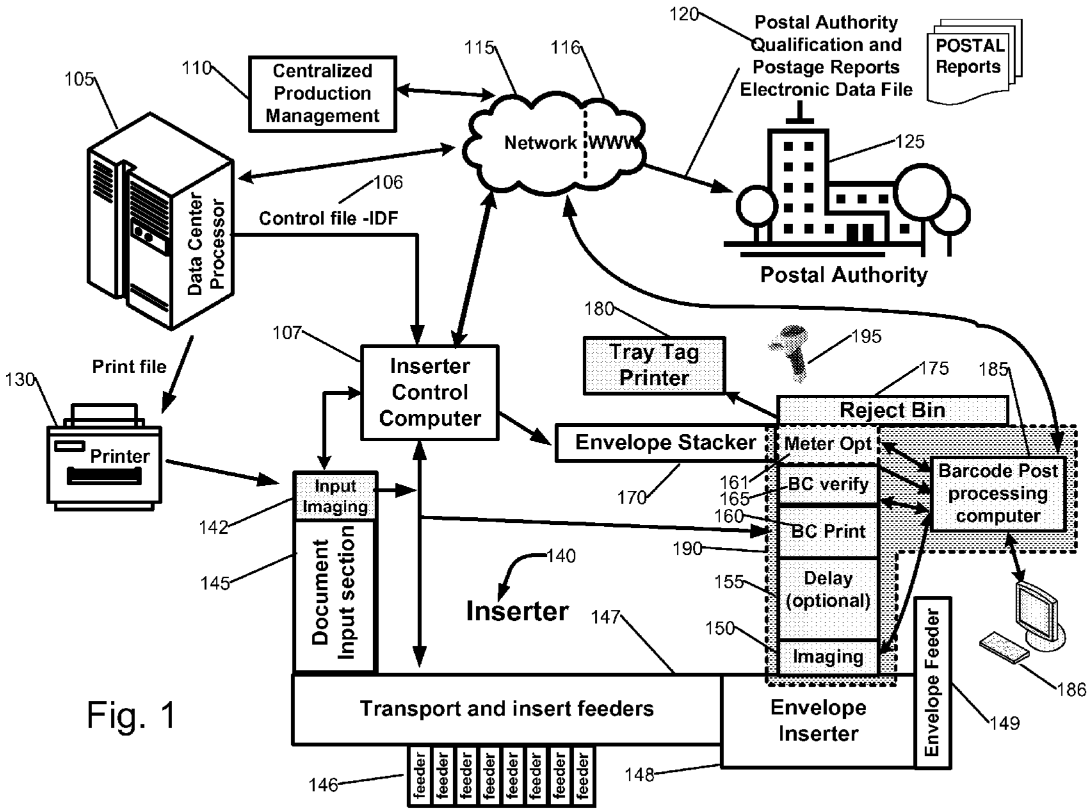
FIG. 1 illustrates the system configuration for an inserter post processing system.

Referring to FIG. 1, the Barcode Post Processing System (BPPS) 190 is attached to an inserter system 140. The barcode post processing system 190 may operate in a stand alone mode instead of being physically attached to an inserter as shown in FIG. 1. Groups of mail pieces would be processed individually with a feed mechanism attached to the barcode post processing system 190. The feed mechanism may be a manual assist feeder or an automatic feeder that processes trays of mail. When each group of mail pieces are processed, a new postal authority barcode is printed on the mail piece as described below and the mail pieces are trayed when output by the barcode post processing system. Postal authority reports are created as required based in part on the new barcode data.

The inserter system 140 is made up of numerous components with one exemplary configuration shown in FIG. 1. Those skilled on the art will devise numerous other configurations. The production of a mailpiece starts with the data center processor 105 where printer control files are created to control the printing of the documents on a production printer 130. These printed documents will be cut and folded on the document input section 145. The folded documents will be transported 147 past insert feeders 146 in preparation for insertion 148 into an envelope supplied from the envelope feeder 149. Control of the inserter 140 is accomplished by the inserter control computer 107. Instructions for document processing and insert feeder control are performed based on reading the contents of a barcode 328, FIG. 3 printed on the document and read with an input imaging system 142. The barcode may contain all the instructions needed to correctly process a mailpiece or the barcode data maybe a reference to an Inserter Data File (IDF) 106 that is provided by the data center processor 105. The inserter control computer 107 controls all steps in the assembly of a mailpiece and tracks its position during each processing step. The envelope inserter 148 completes assembly of the mailpiece and outputs the mailpiece to the barcode post processing system 190.

Figure 3:
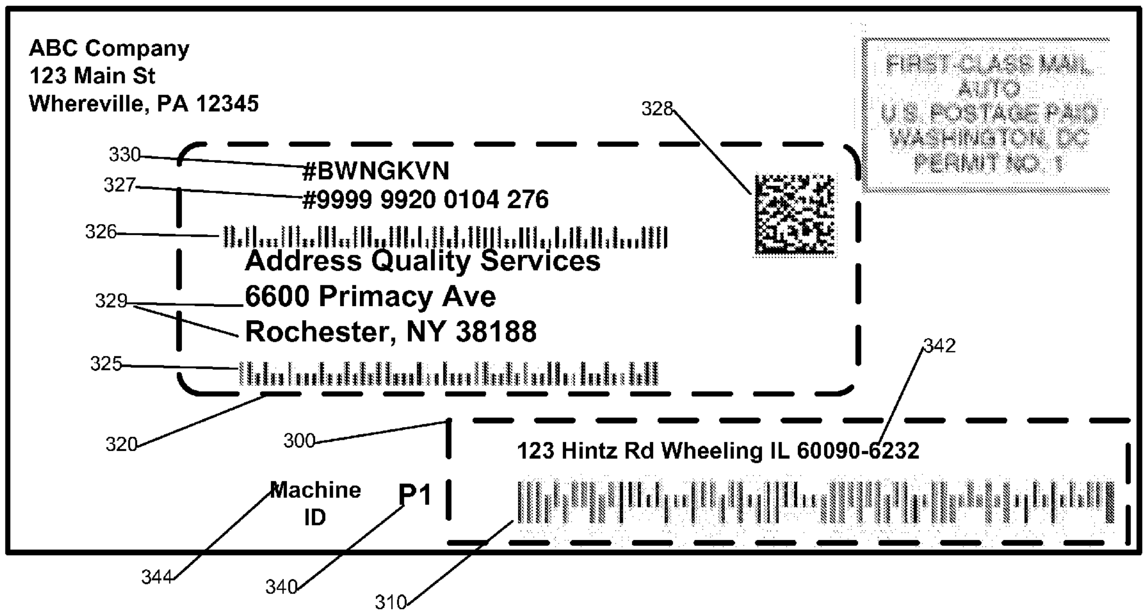
FIG. 3 is an exemplary illustration of a mailpiece with a postal authority barcode printed in the clear zone.

Processing for the barcode post processing system 190 starts by imaging the contents of the address block 320 FIG. 3. The imaging system may be located at either the input imaging system 142 or at the input 150 to the barcode post processing system 190. When that address block 320 is processed by the input imaging system 142, the extracted data will be tracked with the mailpiece as it moves through the inserter to the barcode post processing system input. For this case, the address block is located on the first page of the document versus being visible through a windowed envelope. The tracking data and associated address block information will be transferred to the control processor such as the barcode post processing computer 185 where the data will be used to generate the new barcode (e.g., IMB) 310, FIG. 3. The barcode shown is a 4-state barcode with 31 characters encoded in the barcode. Postal authorities may chose alternate encoding algorithms for the 4-state code and may chose totally different barcode designs to convey the data needed for mail processing requirements. An inserter control barcode 328 may be used to read address block data from the barcode or reference a data file such as the Inserter Data File (IDF) 106 which contains the required data for postal approved barcode (e.g., IMB) creation. In either case the data needed for IMB 310 creation is tracked along with the position of the document in the inserter so that the correct IMB can be printed on the correct finished mail piece, which contains the document being tracked through the inserter. The process control, image processing 150, barcode printer 160, barcode verifier 165, reject bin 175 divertion, data transfer, and system operation of the barcode post processing system 190 will be performed by the barcode post processing computer system 185. The architecture of the barcode post processing computer 185 is driven by many factors such as mailpiece throughput, imaging system complexity and communications requirements, external and internal to barcode post processing system. Those skilled in the art will configure the barcode processing computer 185 as required to meet the barcode post processing system demand. The IMB print data will be transferred to the barcode printer 160 from the barcode post processing computer 185 when the tracked mailpiece arrives at this location.

The imaging system 150, at the input to the barcode post processing system 190, processes mail pieces that were processed on the inserter 140, processed off line by an inserter that is not connected to the barcode post processing system or mail pieces that were manually inserted. The barcode post processing system imaging system 150 is required if the system is operated in stand alone mode or the input imaging 142 is not present or does not provide the required data. When the barcode post processing system imaging 150 is used, the data required for generation of the new postal authority barcode is read through the window of the envelope 320. The image of the barcode is decoded using the appropriate reader and alpha-numeric data is read using Optical Character Recognition (OCR) technology commonly know by those skilled in the art. Other data that is needed for the barcode is entered manually or received from a data file. When the imaging 150 is located at the input to the barcode post processing system 190, a short delay transport 155 may be required to allow time for the imaging system to process the image and extract the needed data for postal barcode print instructions to be generated and sent to the barcode printer 160. The amount of delay depends on the imaging system requirements. A typical range of delay maybe 50 ms to hundreds of milliseconds. A barcode verifier 165 is an option to ensure that the postal barcode is readable, contains the correct data and meets postal authority standards. If the barcode is defective the mailpiece will be diverted to a reject bin 175 instead of the envelope stacker 170. The reject bin 175 would be omitted or disabled when the barcode verifier 165 is not used. Mailpieces maybe transported in the barcode post processing system 190 either in a flat horizontal position or in a vertical position depending on the design preference. Postage metering systems 161 may precede the barcode post processing system, be integrated in the delay section 155 or follow the barcode printer 160 as shown. The postage metering system may receive controls from the inserter control computer 107 that control the amount of postage affixed based on calculated weight of the mailpiece. If the barcode verifier 165 is used and the meters follow this device, the system optionally could inhibit the postage meter operation or change the amount of postage affixed.

The data required for the exemplary postal barcode in the form of an IMB 310 is defined in FIG. 4. The barcode identifier 400, the service type identifier 410 and mailer ID 420 maybe input from an operator terminal 186 on the barcode post processing system or obtained from data transferred from the centralized production management system 110 via the network 115 or from the inserter control computer 107. Data read by the imaging system 142, 150 can be used to set the type of service 410 based on the key line data 327 for address change service and based on the PLANET code 326 for CONFIRM service and mail tracking. Mailer ID 420 could be referenced from the ID in the customer ID 330 to a postal authority Mailer ID contained in the barcode post processing computer 185 or transferred from the centralized production management system 110 or the inserter control computer 107. The delivery point address code 440 can be read from the POSTNET barcode 325 or by reading the address 329 with an OCR system. To meet new postal authority rules the delivery point data from the POSTNET barcode must be certified that it meets postal standards such as Customer Accuracy Support System (CASS™) and Delivery Point Validation (DPV). Without this certification, printing an IMB 310 in the postal authority envelope clear zone 300 may not be authorized. If the POSTNET delivery point is not certified or the POSTNET is not present the address data 329 must be used to obtain the delivery point 440. This process includes performing OCR on the address characters and then matching the address to an entry in the national address database. The match yields the correct delivery point address code 440. The OCR and matching process must be CASS and DPV certified. If move update was required on the address read from the document, a human readable abbreviated version of the move address 342 may have to be printed above the IMB 310 to meet postal authority regulations. Other certifications maybe added over time for different aspects of address accuracy. Alternately, required data maybe obtained by reading the inserter control code 328 and obtaining the data from data records in the centralized production management system 110 or from the inserter control computer 107. The subsystem connectivity shown in FIG. 1 is intended to be representative of one possible configuration that uses networks 115, direct connect 106 and the World Wide Web 116 for external communication to the Postal authority 125. Those skilled in the art will utilize numerous variations.

There are two types of IMB service offered by the postal authority. There is a basic service that does not allow for mailpiece tracking and a full service option that enables the full range of currently offered services. Additional services will be offered and will be included in the barcode post processing system 190 to meet postal authority barcode standards. For basic service, the unique identifier 430, FIG. 4 can be any arbitrary number, entered by the operator or chosen by the mailer. The barcode post processing computer 185 may have an algorithm, provided by the mailer, to generate the unique number, or a data file from which to select the unique number. There is no requirement for the unique identifier 430 in combination with the service type identifier 410 and the Mailer ID 420 to result in the tracking code 450 being unique for basic service. Postal authority standards may change over time to include different data types to represent the tracking code 450.

For full service, the tracking code 450 (unique number) must be certified as unique for a period of time (45 days for the USPS) for all the mail produced by the mailer. The tracking code 450 is defined by a combination of the service type identifier 410, the Mailer ID 420 and the unique identifier 430. A management module (a software routine) is incorporated in the barcode post processing computer 185 or in the centralized production management 110 to take a Mailer ID 420, which has been assigned by the postal authority, and provide a unique identifier 430 that will not be reused for the specified period. The tracking code 450 uniqueness is accomplished by allocating a range of numbers for each production run, matched to a mailer ID and then having the barcode post processing computer 185 sequentially select a number when the postal authority barcode (e.g., IMB) 310 is generated. The barcode post processing computer 185 marks the number as used in the management module when the postal authority barcode 310 is created in printer data prior to printing. Alternately, the barcode post processing computer 185 may utilize an algorithm, provided by the mailer, to generate the unique number, or a data file from which to select the unique number. A data file may be chosen in the case where the unique number is referenced to a address change service match back code.

In addition to putting a unique IMB on every mail piece, full service IMB requires that the mail pieces be tracked to the tray in which they are placed. Each tray tag must have its own unique number. The tray tag unique number is assigned by the management module, which ensures uniqueness for the postal authority defined period. The tray contents are associated with individual mail pieces by data transferred between the inserter control computer 107 and the barcode post processing computer 185. Alternately the tray break data may be determined by an imagining system, or looked up in a data file provided by the data center processor 105, or looked up in the inserter control data file (IDF) 106. The inserter control computer 107 identifies the tray break points for the mail pieces that are on the stacker 170 and instructs the stacker to mark the mail piece that is either the beginning or end of a tray group. The tray break points are determined by calculating the thickness of a group of mail pieces based on the contents in each mailpiece (document pages plus any inserts) and determining the number of pieces required to fill a 24 inch or 12 inch mail tray. The contents of each tray are determined by the combined thickness of the group of mail pieces and the postal authority delivery point address code approved groupings (ZIPCODE grouping). The tray break groupings are determined by the data center processor 105 when the print file and IDF 106 are created. Tray break tracking data is sent to the barcode post processing computer 185 from the inserter control computer 107. The barcode post processing computer 185 will control the tray tag printer 180 to print the correct unique tray tag. The inserter operator may use a tray tag and IMB scanner 195 to identify each completed tray. Alternately, use of the tray tag scanner 195 is required if the tray tags were printed in advance of the production run based on the expected tray group data available from the data center processor 105. In this case the barcode post processing computer 185 would have to create the tray tag print data since the data center processor 105 would not have a management module to manage the creation of unique tray tags. Verification of the tray contents maybe achieved by scanning the IMB of the first and last mail piece in the tray with the scanner 195. Reading the IMB of the first and last mail piece in a tray group identifies the complete contents of a tray group since the inserter control computer 107 has tracked each mail piece as it was manufactured in the inserter and the barcode post processing computer 185 maintains a record of each IMB created and printed. The mail pieces have been manufactured in pre-sort order as required by the postal authority for work share postage discounts to be granted.

Full service IMB for the USPS, also requires that mail pieces be tracked by IMB to a tray groups and tray groups to shipping pallet containers. Those skilled in the art have created pallet scheme generation software that meets the postal authority shipping requirements. One solution to enabling the tracking of trays to pallets is to have a tray tag scanner in the shipping area that is similar to 195. A tray is scanned in the shipping area to read the postal authority sort group and unique ID. This data is used by the pallet scheme software to identify which pallet the tray should be added to. The pallet scheme software maybe resident in a dedicated pallet server (not shown) The scanner 195 can be used to read the unique pallet ID to complete the association. The pallet data, tray data and mail piece data can all be integrated by the barcode post processing computer 185 or the central production management 110 to create the postal authority reports and electronic data files 120 required for a full service mailing submission.

Additional postal authority requirements can be met to complete reporting data requirements and audit requirements. If postage is not affixed to the mail piece (postage meter applied), a weight category 340 FIG. 3 (P1, P2, P3 corresponding to 1 ounce, 2 ounce and 3 ounce respectively) may be printed on the mail piece to the left of the barcode 310. This is required for mixed weight permit mailings. Control signals that are available from the inserter control computer 107 for postage meter rate control (different postage rates depending on the weight category of the mail piece) or weight data associated with mail pieces, as described above, maybe used to control the barcode printer 160 to print the weight code 340. In addition, machine identification 344 maybe required as part of the quality audit. The machine ID 344 is printed by the BC printer 160 to the left of the barcode 310. The machine ID allows the postal authority to trace defective mail pieces to the inserter that was used to manufacture them and initiate corrective action of postage discount refunds.

Figure 2:
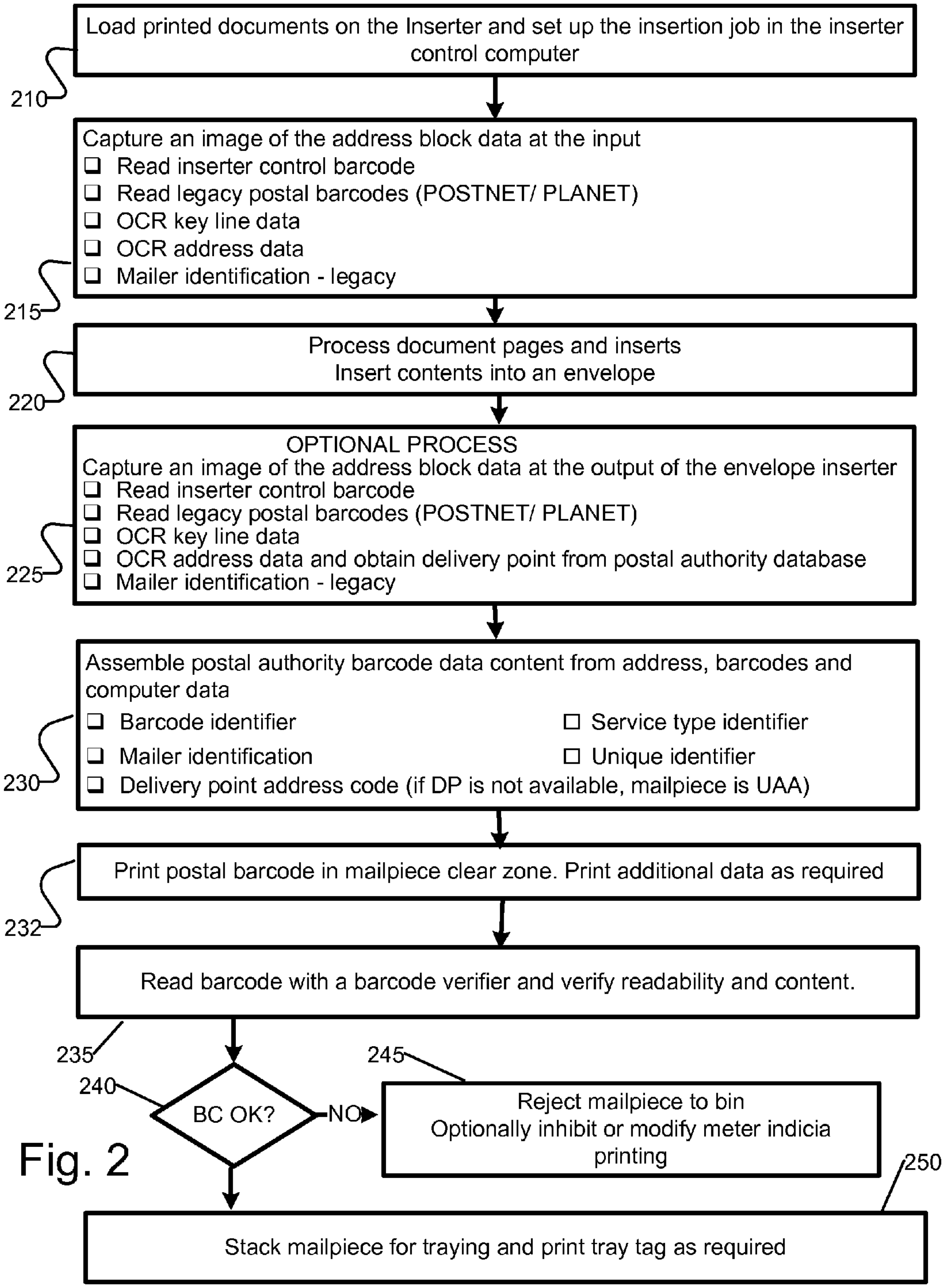
FIG. 2 is an exemplary flow diagram of the steps required to print a postal authority barcode.

Referring to FIG. 2 to define the steps required to print a postal authority barcode in a specified region of the envelope that is reserved for the barcode. This area is referred to as the clear zone by the USPS. All other barcodes, including barcodes in the address block are ignored by the mail processing automation equipment when a barcode is printed in the clear zone. FIG. 1 is used to reference system components. The flow chart in FIG. 2 is exemplary and does not define all sub-steps since those skilled in the art may implement the barcode creation and printing steps with alternate approaches. In STEP 210 the documents to be inserted into envelopes along with inserts are load on the inserter input system 145 and inserts are loaded into the insert feeders 146. The inserting job is setup on the inserter control computer 107 using an interface terminal similar to 186. Additional setup data maybe accessed by the operator from data that was downloaded from the centralized production management system 110. The barcode post processing system 190 also may require setup with the interface terminal 186 and data downloads from the centralized production management system 110. Typical setup data may include, but not limited to, the Mailer ID, unique number generation algorithms or parameters, barcode identifier and service type identifier.

Many inserters include an imaging system 142 at the document input section 145 that is capable of reading data contained in the address block 320 of the first page of a document (STEP 215). As discussed above, much of the data needed to create an IMB can be obtained from information in the address block and shown in FIG. 3. This data may include: Inserter control barcode 328; Legacy postal barcodes (POSTNET 325/PLANET 326); OCR key line data 327; OCR address data 329; and Mailer identification 330—legacy. Of course, those skilled in the art will recognize that data requirements may vary depending on the type or form of postal barcode required as well as variances in regulations by geographic region. The next STEP 220 is the manufacture of the mail piece where the folded document and inserts are inserted into an envelope 148. The completed envelope is input to the barcode post processing system 190 for further processing.

If an input imaging system 142 was not available or had insufficient capability to read the address block data, an imaging system 150 is required to read the data defined in the preceding paragraph (STEP 225). Once the data is read from printed information, collected from data files associated with the IDF 106, read from data files transferred from the centralized production management 110 and/or input by an operator, the IMB can be created using the coding algorithm (STEP 230). The data coded in the IMB may include: Barcode identifier (FIG. 4, 400); Service type identifier 410; Mailer identification 420; Unique identifier 430; and Delivery point address code 440. The exact format of the data coded in the postal authority barcode will be changed as new standards are put in place due to requirement changes. Indeed, while the IMB is presented as an exemplary postal approved barcode, the teachings are not limited to any one form. Indeed, other postal approved barcodes such as data matrix, glyph codes, PDF-417, etc. Furthermore, the teachings are applicable to postal authorities outside of the US or even private posts and courier services. Using the mail piece tracking capability of the inserter, the postal authority barcode data associated with a specific mail piece is known when it reaches the barcode printer 160. This association ensures that the data synchronization is maintained. Once the barcode information is assembled, the barcode is coded using the barcode font and an encoding algorithm. In STEP 232, the barcode is printed in the postal authority clear zone 300. Other locations on the envelope may be specified for printing the barcode. If move update was required on the address read from the document, a human readable abbreviated version of the move address 342 may have to be printed above the IMB 310 to meet postal authority regulations. If the move delivery point is not consistent with the delivery point presort group being processed the mailpiece may need to diverted to the reject bin 175 for special handling. Additional items such as but not limited to the weight class 340 and machine ID 344 may have to be printed.

STEP 235, barcode verification is optional but is frequently included. The verifier 165 reads the barcode and verifies that the data content matches the data content that was sent to the printer 160. In addition, the print quality of the barcode can be verified to postal standards. If the barcode is defective (STEP 240), the mail piece will be rejected STEP 245 to reject bin 175. It may be required to inhibit printing of the meter indicia for defective mailpieces or print a different postage amount. The data records 120 will be updated to account for any rejects. If the mail piece is ok, it is sent to the envelope stacker 170 to be put into trays for delivery to the postal authority for customer delivery. Tray tags are printed as required or preprinted and put on the correct tray by the operator. Data tracking of trays is best completed with a tag reader 195. Since the mail piece tracking and tray breaks are known, the expected tray contents is also known by the inserter tracking system and barcode post processing computer 185, the scanner 195 is used to confirm that the tray tag is correct for its contents and enters the tray tag unique identifier into the data record 120.

As shown by the above discussion, aspects of the document processing systems are controlled or implemented by one or more processors/controllers, such as one or more computers (185) or servers as shown in FIG. 1. Typically, each such processor/controller is implemented by one or more programmable data processing devices. The hardware elements operating systems and programming languages of such devices are conventional in nature, and it is presumed that those skilled in the art are adequately familiar therewith.

Figure 5:
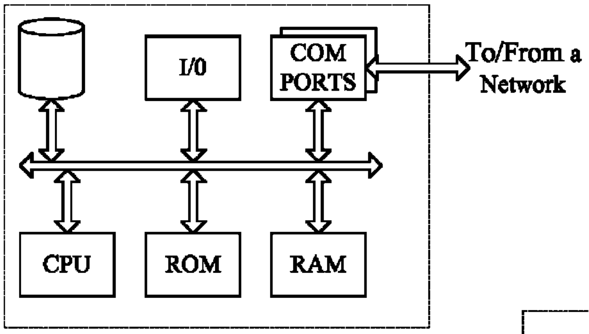
FIG. 5 illustrates a network or host computer platform, as may typically be used to implement a server.
Figure 6:
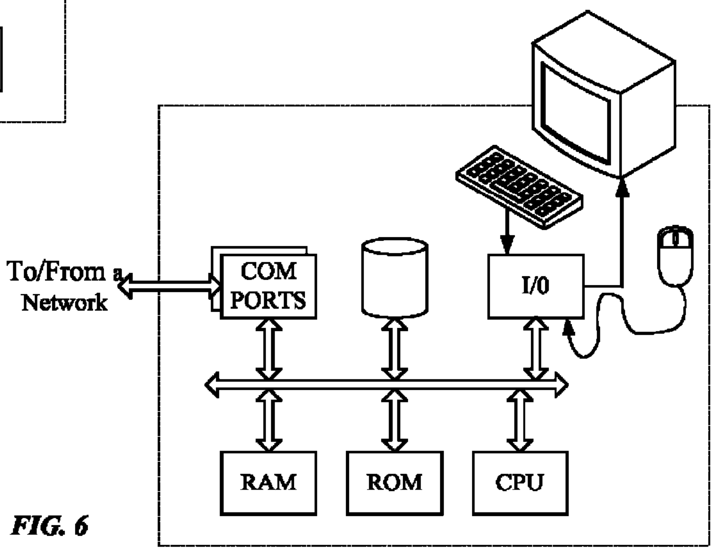
FIG. 6 depicts a computer with user interface elements.

FIGS. 5 and 6 provide functional block diagram illustrations of general purpose computer hardware platforms. FIG. 5 illustrates a network or host computer platform, as may typically be used to implement a server. FIG. 6 depicts a computer with user interface elements, as may be used to implement a personal computer or other type of work station or terminal device, although the computer of FIG. 6 may also act as a server if appropriately programmed. It is believed that those skilled in the art are familiar with the structure, programming and general operation of such computer equipment and as a result the drawings should be self-explanatory.

For example, controller 107 in FIG. 1 may be a PC based implementation of a central control processing system, or may be implemented on a platform configured as a central or host computer or server. Such a system typically contains a central processing unit (CPU), memories and an interconnect bus. The CPU may contain a single microprocessor (e.g. a Pentium microprocessor), or it may contain a plurality of microprocessors for configuring the CPU as a multi-processor system. The memories include a main memory, such as a dynamic random access memory (DRAM) and cache, as well as a read only memory, such as a PROM, an EPROM, a FLASH-EPROM, or the like. The system memories also include one or more mass storage devices such as various disk drives, tape drives, etc.

In operation, the main memory stores at least portions of instructions for execution by the CPU and data for processing in accord with the executed instructions, for example, as uploaded from mass storage. The mass storage may include one or more magnetic disk or tape drives or optical disk drives, for storing data and instructions for use by CPU. For example, at least one mass storage system in the form of a disk drive or tape drive, stores the operating system trigger definitions and various application software as well as data, such as MIDs, histories, job data, target data, scripts, as discussed in detail above. The mass storage within the computer system may also include one or more drives for various portable media, such as a floppy disk, a compact disc read only memory (CD-ROM), or an integrated circuit non-volatile memory adapter (i.e. PC-MCIA adapter) to input and output data and code to and from the computer system.

The system also includes one or more input/output interfaces for communications, shown by way of example as an interface for data communications with one or more other processing systems. Although not shown, one or more such interfaces may enable communications via a network, e.g., to enable sending and receiving instructions electronically. The physical communication links may be optical, wired, or wireless.

The computer system may further include appropriate input/output ports for interconnection with a display and a keyboard serving as the respective user interface for the processor/controller. For example, a computer implementation of controller 107 may include a graphics subsystem to drive the output display. The output display, for example, may include a cathode ray tube (CRT) display, or a liquid crystal display (LCD) or other type of display device. Although not shown, a PC type system implementation typically would include a port for connection to a printer. The input control devices for such an implementation of the system would include the keyboard for inputting alphanumeric and other key information. The input control devices for the system may further include a cursor control device (not shown), such as a mouse, a touchpad, a trackball, stylus, or cursor direction keys. The links of the peripherals to the system may be wired connections or use wireless communications.

The computer system runs a variety of applications programs and stores data, enabling one or more interactions via the user interface provided, and/or over a network to implement the desired processing, in this case, including those for processing mail item data and related marketing actions as discussed above.

The components contained in the computer system are those typically found in general purpose computer systems. Although summarized in the discussion above mainly as a PC type implementation, those skilled in the art will recognize that the class of applicable computer systems also encompasses systems used as host computers, servers, workstations, network terminals, and the like. In fact, these components are intended to represent a broad category of such computer components that are well known in the art.

Hence aspects of the techniques discussed herein encompass hardware and programmed equipment for controlling the relevant mail processing (e.g., sorting, inserting, wrapping, etc.) as well as software programming, for controlling the relevant functions. A software or program product, which may be referred to as an "article of manufacture" may take the form of code or executable instructions for causing a computer or other programmable equipment to perform the relevant data processing steps regarding mail item processing, where the code or instructions are carried by or otherwise embodied in a medium readable by a computer or other machine. Instructions or code for implementing such operations may be in the form of computer instruction in any form (e.g., source code, object code, interpreted code, etc.) stored in or carried by any readable medium.

Such a program article or product therefore takes the form of executable code and/or associated data that is carried on or embodied in a type of machine readable medium. "Storage" type media include any or all of the memory of the computers, processors or the like, or associated modules thereof, such as various semiconductor memories, tape drives, disk drives and the like, which may provide storage at any time for the software programming. All or portions of the software may at times be communicated through the Internet or various other telecommunication networks. Such communications, for example, may enable loading of the software from one computer or processor into another, for example, from a management server or host computer. Thus, another type of media that may bear the software elements includes optical, electrical and electromagnetic waves, such as used across physical interfaces between local devices, through wired and optical landline networks and over various air-links. The physical elements that carry such waves, such as wired or wireless links, optical links or the like, also may be considered as media bearing the software. As used herein, unless restricted to tangible "storage" media, terms such as computer or machine "readable medium" refer to any medium that participates in providing instructions to a processor for execution.

Hence, a machine readable medium may take many forms, including but not limited to, a tangible storage medium, a carrier wave medium or physical transmission medium. Non-volatile storage media include, for example, optical or magnetic disks, such as any of the storage devices in any computer (s) or the like, such as may be used to implement the sorting control and attendant mail item tracking based on unique mail item identifier. Volatile storage media include dynamic memory, such as main memory of such a computer platform. Tangible transmission media include coaxial cables; copper wire and fiber optics, including the wires that comprise a bus within a computer system. Carrier-wave transmission media can take the form of electric or electromagnetic signals, or acoustic or light waves such as those generated during radio frequency (RF) and infrared (IR) data communications. Common forms of computer-readable media therefore include for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a PROM and EPROM, a FLASH-EPROM, any other memory chip or cartridge, a carrier wave transporting data or instructions, cables or links transporting such a carrier wave, or any other medium from which a computer can read programming code and/or data. Many of these forms of computer readable media may be involved in carrying one or more sequences of one or more instructions to a processor for execution.

In the detailed description above, numerous specific details are set forth by way of examples in order to provide a thorough understanding of the relevant teachings. However, it should be apparent to those skilled in the art that the present teachings may be practiced without such details. In other instances, well known methods, procedures, components, and software have been described at a relatively high-level, without detail, in order to avoid unnecessarily obscuring aspects of the present teaching.

What is claimed is:

1. A method of printing a new postal authority code on a mail piece prepared by and received from an inserter, the method comprising steps of:

receiving, at a barcode post-processing system that receives a mail piece from the inserter, legacy address block information from the mail piece captured by an imaging system in communication with the barcode post-processing system;

processing, by the barcode post-processing system, the captured legacy address block information to determine one or more missing parameters of the new postal authority code;

supplementing the captured legacy address block information with the one or more missing parameters of the new postal authority code, the one or more missing parameters being received from one or more data sources in communication with barcode post-processing system; and printing, by a printer in communication with the barcode post-processing system, the new postal authority code on a designated section of the mail piece, the designated section being defined by a standard regarding the new postal authority code, wherein wherein the legacy address block information comprises at least one of the group consisting of: a PLANET code, a POSTNET code, key line data, mailer identification information, and an inserter code.

2. The method of claim 1, further comprising obtaining a delivery point acquired by using optical character recognition from legacy address data prior to printing the new postal authority code.

3. The method of claim 2, further comprising comparing the obtained delivery point with information from a national address database to validate that the delivery point is valid.

4. The method of claim 1, further comprising printing move update data above the new postal authority code.

5. The method of claim 1, further comprising assigning a unique identifier, generated by the barcode post-processing device, to the mail piece.

6. The method of claim 5, wherein the unique identifier is included in the new postal authority code.

7. The method of claim 1, wherein the step of supplementing the processed data comprises:

capturing an inserter control code from the mail piece, by the imaging processing system;

requesting, by the barcode post-processing system, data associated with the inserter control code; and receiving the requested data from a data records system that stores the requested data associated with the inserter control code.

8. The method of claim 1, wherein the new postal authority code comprises an intelligent mail barcode (IMB).

9. A method of printing a new postal authority code on a mail piece prepared by and received from an inserter, the method comprising steps of:

receiving, at a barcode post-processing system that receives a mail piece from the inserter, legacy address block information from the mail piece captured by an imaging system in communication with the barcode post-processing system;

processing, by the barcode post-processing system, the captured legacy address block information to determine one or more missing parameters of the new postal authority code;

supplementing the captured legacy address block information with the one or more missing parameters of the new postal authority code, the one or more missing parameters being received from one or more data sources in communication with barcode post-processing system;

assigning a unique identifier, generated by the barcode post-processing device, to the mail piece;

generating, by the barcode post-processing device, a tracking code being defined by some combination of a service type identifier, a mailer identifier, and the unique identifier, the service type identifier and mailer identifier being captured from the legacy address block data; and printing, by a printer in communication with the barcode post-processing system, the new postal authority code on a designated section of the mail piece, the designated section being defined by a standard regarding the new postal authority code.

10. A mail processing system comprising:

an inserter;

image capture equipment;

a barcode post-processing system that receives a mail piece from the inserter and communicates with the image capture equipment, the barcode post-processing system during operation of the mail processing system performing the following functions:

receiving legacy address block information from the mail piece from the image capture equipment;

processing the captured legacy address block information to determine one or more missing parameters of the new postal authority code to create processed data; and supplementing the captured legacy address block information data with the one or more missing parameters of the new postal authority code received from one or more data sources; and a printer in communication with the barcode post-processing system, the printer printing the new postal authority code on a designated section of the mail piece, the designated section being defined by a standard regarding the new postal authority code, wherein the legacy address block information comprises at least one of the group consisting of: a PLANET code, a POSTNET code, key line data, mailer identification information, and an inserter code.

11. The system of claim 10, wherein the barcode post-processing system further performs the function of obtaining a delivery point acquired by using optical character recognition from legacy address data prior to printing the new postal authority code.

12. The system of claim 11, further comprises comparing the obtained delivery point with information from a national address database to validate that the delivery point is valid.

13. The system of claim 10, wherein the printer prints move update data above the new postal authority code.

14. The system of claim 10, wherein the barcode post-processing system further performs the function of assigning a unique identifier to the mail piece.

15. The system of claim 14, wherein the unique identifier is included in the new postal authority code.

16. The system of claim 10, wherein the imagine capture equipment captures an inserter control code that is used by the barcode post-processing system to request data associated with the inserter control code from a data records system that stores the requested data associated with the inserter control code.

17. The system of claim 10, wherein the new postal authority code comprises an intelligent mail barcode (IMB).

18. A mail processing system comprising:

an inserter;

image capture equipment;

a barcode post-processing system that receives a mail piece from the inserter and communicates with the image capture equipment, the barcode post-processing system during operation of the mail processing system performing the following functions:

receiving ac address block information from the mail piece from the image capture equipment;

processing the captured legacy address block information to determine one or more missing parameters of the new postal authority code to create processed data; and supplementing the captured legacy address block information data with the one or more missing parameters of the new postal authority code received from one or more data sources; and a printer in communication with the barcode post-processing system, the printer printing the new postal authority code on a designated section of the mail piece, the designated section being defined by a standard regarding the new postal authority code, assigning a unique identifier to the mail piece, and generating a tracking code being defined by some combination of a service type identifier, a mailer identifier, and the unique identifier, the service type identifier and mailer identifier being captured in the legacy address block.

19. An article of manufacture comprising:

a machine readable storage medium; and executable program instructions embodied in the machine readable storage medium that when executed by one or more programmable systems that receives a mail item from an inserter causes the one or more systems to perform functions that print a new postal authority code on a mail piece, the functions comprising:

receiving legacy address block information from the mail piece captured by an imaging system in communication with the one or more programmable systems that receives a mail item;

processing the captured legacy address block information to determine one or more missing parameters of the new postal authority code to create processed data;

supplementing the captured legacy address block information with the one or more missing parameters of the new postal authority code received from one or more data sources; and printing the new postal authority code on a designated section of the mail piece, the designated section being defined by a standard regarding the new postal authority code, wherein the legacy address block information comprises at least one of the group consisting of: a PLANET code, a POSTNET code, key line data, mailer identification information, and an inserter code.

20. The article of manufacture of claim 19, wherein the functions further comprise obtaining a delivery point acquired by using optical character recognition from legacy address data prior to printing the new postal authority code.

21. The article of manufacture of claim 20, further comprising comparing the obtained delivery point with information from a national address database to validate that the delivery point is valid.

22. The article of manufacture of claim 19, further comprising the function of printing move update data above the new postal authority code.

23. The article of manufacture of claim 19, further comprising the function of assigning a unique identifier to the mail piece.

24. The article of manufacture of claim 23, wherein the unique identifier is included in the new postal authority code.

25. The article of manufacture of claim 19, wherein the new postal authority code comprises an intelligent mail barcode (IMB).

26. An article of manufacture comprising:

a machine readable storage medium; and executable program instructions embodied in the machine readable storage medium that when executed by one or more programmable systems that receives a mail item from an inserter causes the one or more systems to perform functions that print a new postal authority code on a mail piece, the functions comprising:

receiving legacy address block information from the mail piece captured by an imaging system in communication with the one or more programmable systems that receives a mail item;

processing the captured legacy address block information to determine one or more missing parameters of the new postal authority code to create processed data;

supplementing the captured legacy address block information with the one or more missing parameters of the new postal authority code received from one or more data sources;

assigning a unique identifier to the mail piece;

generating a tracking code being defined by some combination of a service type identifier, a mailer identifier, and the unique identifier, the service type identifier and mailer identifier being captured in the legacy address block; and printing the new postal authority code on a designated section of the mail piece, the designated section being defined by a standard regarding the new postal authority code.

27. A method of printing a new postal authority code on a mail piece prepared by and received from an inserter, the method comprising steps of:

capturing an image of at least a portion of the mail piece containing a legacy address block;

obtaining information from the legacy address block from processing of the image;

processing the information from the legacy address block code to determine one or more missing parameters required for the new postal authority;

supplementing the information with the one or more missing parameters from one or more data sources; and printing the new postal authority code on a designated section of the mail piece, wherein:

(a) the printed new postal authority code is based on the information from the legacy address block and the one or more missing parameters, and (b) the designated section of the mail piece is a section defined by a standard regarding the new postal authority code, wherein the legacy address block information comprises at least one of the group consisting of: a PLANET code, a POSTNET code, key line data, mailer identification information, and an inserter code.

28. A method of printing a new postal authority code on a mail piece prepared by and received from an inserter, the method comprising steps of:

capturing an image of at least a portion of the mail piece containing a legacy address block;

obtaining information from the legacy address block from processing of the image;

processing the information from the legacy address block code to determine one or more missing parameters required for the new postal authority code;

supplementing the information with the one or more missing parameters from one or more data sources;

assigning a unique identifier to the mail piece; and generating a tracking code contained within the new postal authority code, the tracking code being defined by some combination of a service type identifier, a mailer identifier, and the unique identifier, the service type identifier and mailer identifier being captured in the legacy address block, wherein:

(a) the printed new postal authority code is based on the information from the legacy address block and the one or more missing parameters, and (b) the designated section of the mail piece is a section defined by a standard regarding the new postal authority code.

* * * * *